US009989191B2

(12) United States Patent
Parker et al.

(10) Patent No.: US 9,989,191 B2
(45) Date of Patent: Jun. 5, 2018

(54) FRICTION STOP DEVICE

(71) Applicant: Zodiac Seats US LLC, Gainesville, TX (US)

(72) Inventors: Ty W. Parker, Sanger, TX (US); Jeffrey Johnston, Huntington Beach, CA (US); Matthew K. Zemler, Corinth, TX (US); Sebastian S. Delgadillo, Denton, TX (US); Matt Jones, Rosston, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 148 days.

(21) Appl. No.: 14/903,106

(22) PCT Filed: Jul. 9, 2014

(86) PCT No.: PCT/US2014/045846
§ 371 (c)(1),
(2) Date: Jan. 6, 2016

(87) PCT Pub. No.: WO2015/006388
PCT Pub. Date: Jan. 15, 2015

(65) Prior Publication Data
US 2017/0002972 A1     Jan. 5, 2017

Related U.S. Application Data

(60) Provisional application No. 61/843,964, filed on Jul. 9, 2013.

(51) Int. Cl.
*F16M 13/02*     (2006.01)
*B60R 11/02*     (2006.01)
(Continued)

(52) U.S. Cl.
CPC ............ *F16M 13/02* (2013.01); *B60N 2/242* (2013.01); *B60N 3/002* (2013.01);
(Continued)

(58) Field of Classification Search
CPC ....... F16M 2200/022; F16M 2200/024; F16M 2200/06; F16M 13/02; F16M 11/18;
(Continued)

(56) References Cited

U.S. PATENT DOCUMENTS 5,076,524 A * 12/1991 Reh .................. B60N 2/468
248/296.1
5,177,616 A * 1/1993 Riday .............. B64D 11/0015
248/917

(Continued)

FOREIGN PATENT DOCUMENTS

CN    201069662     6/2008
CN    105358376     2/2016
(Continued)

OTHER PUBLICATIONS

International Patent Application No. PCT/US2014/045846, International Preliminary Report on Patentability dated Jan. 21, 2016.
(Continued)

*Primary Examiner* — Anita M King
(74) *Attorney, Agent, or Firm* — Kilpatrick Townsend & Stockton LLP; Dean W. Russell; Davidson G. Lucas

(57) ABSTRACT

Deployment apparatus (10) including a deployment object (12), a deployment arm (16) with a first end (22) coupled to the deployment object and a second end (24) having a pivot (26), and a hinge assembly (18) rotatably attached to the pivot of the deployment arm. The hinge assembly (18) includes an enclosure (44) and a friction stop device (82) disposed within the enclosure such that the friction stop device includes a friction portion (80) configured to be
(Continued)

pressed against a lateral surface of the pivot (26) of the deployment arm such that the friction portion provides a predetermined torque. The predetermined torque may be calculated based on maintaining a deployed angle of the deployment arm (16) such that the deployment object (12) is held in a raised deployed position.

19 Claims, 13 Drawing Sheets

(51) Int. Cl.
<table>
<tr><td>B64D 11/06</td><td>(2006.01)</td></tr>
<tr><td>B64D 11/00</td><td>(2006.01)</td></tr>
<tr><td>F16M 11/12</td><td>(2006.01)</td></tr>
<tr><td>F16M 11/18</td><td>(2006.01)</td></tr>
<tr><td>F16M 11/20</td><td>(2006.01)</td></tr>
<tr><td>B60N 2/24</td><td>(2006.01)</td></tr>
<tr><td>B60N 3/00</td><td>(2006.01)</td></tr>
<tr><td>B61D 33/00</td><td>(2006.01)</td></tr>
<tr><td>B61D 37/00</td><td>(2006.01)</td></tr>
<tr><td>B60R 11/00</td><td>(2006.01)</td></tr>
</table>

(52) U.S. Cl.
CPC ...... B60R 11/0235 (2013.01); B61D 33/0007 (2013.01); B61D 37/00 (2013.01); B64D 11/0015 (2013.01); B64D 11/00151 (2014.12); B64D 11/0638 (2014.12); F16M 11/126 (2013.01); F16M 11/18 (2013.01); F16M 11/2021 (2013.01); B60R 2011/0082 (2013.01); B60R 2011/0085 (2013.01); F16M 2200/022 (2013.01); F16M 2200/024 (2013.01); F16M 2200/06 (2013.01)

(58) Field of Classification Search
CPC .. F16M 11/2021; B61D 33/007; B61D 37/00; B60R 2011/0082; B60R 2011/0085; B60R 11/0235; B64D 11/00151; B64D 11/0638; B64D 11/0015; B64D 11/126; B60N 3/002; B60N 2/242
USPC ...................................................... 248/276.1
See application file for complete search history.

(56) References Cited

U.S. PATENT DOCUMENTS

<table>
<tr><td>5,996,954</td><td>A</td><td></td><td>12/1999</td><td>Rosen et al.</td></tr>
<tr><td>6,007,036</td><td>A</td><td>*</td><td>12/1999</td><td>Rosen ................ B60R 11/0235<br>224/281</td></tr>
<tr><td>6,179,263</td><td>B1</td><td>*</td><td>1/2001</td><td>Rosen ................ B60R 11/0235<br>248/278.1</td></tr>
<tr><td>8,322,670</td><td>B2</td><td></td><td>12/2012</td><td>Westerink</td></tr>
<tr><td>8,523,130</td><td>B2</td><td>*</td><td>9/2013</td><td>Westerink .......... B64D 11/0015<br>16/363</td></tr>
<tr><td>9,527,456</td><td>B2</td><td>*</td><td>12/2016</td><td>Ackeret ................. B60R 11/02</td></tr>
<tr><td>9,617,001</td><td>B2</td><td>*</td><td>4/2017</td><td>Zimmermann .. B64D 11/00153</td></tr>
<tr><td>9,732,901</td><td>B2</td><td>*</td><td>8/2017</td><td>Satterfield .......... F16M 11/2021</td></tr>
<tr><td>9,849,818</td><td>B2</td><td>*</td><td>12/2017</td><td>Barnes .................. B60N 3/001</td></tr>
<tr><td>2002/0066392</td><td>A1</td><td>*</td><td>6/2002</td><td>Calam .................... B60N 2/468<br>108/33</td></tr>
<tr><td>2006/0219857</td><td>A1</td><td></td><td>10/2006</td><td>Satterfield</td></tr>
<tr><td>2010/0243839</td><td>A1</td><td></td><td>9/2010</td><td>Westerink</td></tr>
<tr><td>2011/0261273</td><td>A1</td><td></td><td>10/2011</td><td>Weaver</td></tr>
</table>

FOREIGN PATENT DOCUMENTS

<table>
<tr><td>DE</td><td>102010019849</td><td>11/2011</td></tr>
<tr><td>EP</td><td>3019371</td><td>5/2016</td></tr>
<tr><td>GB</td><td>2392709</td><td>3/2004</td></tr>
<tr><td>JP</td><td>2003240012</td><td>8/2003</td></tr>
<tr><td>WO</td><td>1999015742</td><td>4/1999</td></tr>
<tr><td>WO</td><td>2010117758</td><td>10/2010</td></tr>
<tr><td>WO</td><td>2012082071</td><td>6/2012</td></tr>
<tr><td>WO</td><td>2015006388</td><td>1/2015</td></tr>
</table>

OTHER PUBLICATIONS

International Patent Application No. PCT/US2014/045846, Invitation to Pay Additional Fees and, Where Applicable, Protest Fee dated Oct. 22, 2014.
International Patent Application No. PCT/US2014/045846, Search Report and Written Opinion dated Feb. 17, 2015.
China Patent Application No. 201480037764.6, Office Action (including English translation), dated Feb. 24, 2017.
Europe Patent Application No. 14745030.8, Examination Report dated Jun. 16, 2017.

* cited by examiner

FRICTION STOP DEVICE

CROSS REFERENCE TO RELATED APPLICATIONS

This application is the U.S. national phase entry of International Patent Application Serial No. PCT/US2014/045846 ("the '846 application"), filed on Jul. 9, 2014, which application is related to and claims priority benefits from U.S. Provisional Application Ser. No. 61/843,964 ("the '964 application"), filed on Jul. 9, 2013, entitled COMPOSITE FRICTION MATERIAL IN VIDEO ARM. The '846 and '964 applications are hereby incorporated in their entireties by this reference.

FIELD OF THE INVENTION

The field of the invention relates to deployment apparatuses for passenger seats or the like.

BACKGROUND

Many vehicle seats such as those on passenger aircraft, buses, trains and the like require stowage of objects when not in use. For example, many seat designs utilize the space below the seat cross beams to stow video display devices or monitors, tray tables, cocktail tables, and the like. In many instances, the object to be stowed, after being released from a locked deployed position, falls or moves in an overly abrupt fashion towards the stowed position.

In certain situations, it may be desirable to hold or maintain the object to be stowed at or near the deployed position after a locking mechanism has released the object to reduce risk of injury, risk of damage to the object, or a partial stowed position.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a deployment apparatus comprises a deployment object, a deployment arm with a first end coupled to the deployment object and a second end having a pivot, and a hinge assembly rotatably attached to the pivot of the deployment arm. The hinge assembly comprises an enclosure and a friction stop device disposed within the enclosure, the friction stop device comprising a friction portion configured to be pressed against a lateral surface of the pivot of the deployment arm such that the friction portion provides a predetermined torque.

In some embodiments, the predetermined torque is calculated based on maintaining a deployed angle of the deployment arm such that the deployment object is held in a raised deployed position.

The friction portion, in certain embodiments, is disposed axially with respect to a rotational axis at the second end of the deployment arm.

The friction stop device, in some embodiments, further comprises a first backing plate bonded to the friction portion.

In some embodiments, the friction stop device further comprises one or more Belleville washers configured to maintain a compression load on the friction portion.

The hinge assembly, in certain embodiments, further comprises one or more set screws configured to change a compression load on the friction portion.

In certain embodiments of the present invention, the deployment object is selected from the group consisting of a display monitor, a tray table, and a cocktail table.

In some embodiments, the hinge assembly further comprises a deployment arm mount, the deployment arm mount comprising at least two tracks that are slidingly engaged with a plurality of linear bearings on a surface of the enclosure.

The hinge assembly, in certain embodiments, further comprises a gas spring coupled at one end to the enclosure and coupled at an opposing end to the deployment arm mount.

The friction portion, in some embodiments, comprises a centrally located substantially square hole. In certain embodiments, the friction portion comprises a cylindrical outer surface except for one or more flat surfaces.

In some embodiments, the hinge assembly further comprises a mechanical lockout configured to maintain the deployment object in a deployed position. In certain embodiments, the mechanical lockout comprises a projection configured to engage a notch.

According to certain embodiments of the present invention, a deployment apparatus comprises a deployment object, a deployment arm with a first end coupled to the deployment object, and a hinge assembly that is rotatably attached to a second end of the deployment arm. The hinge assembly comprises an enclosure, a friction stop device disposed within the enclosure such that the friction stop device comprises a friction portion disposed axially with respect to a rotational axis at the second end of the deployment arm, a first backing plate bonded to the friction portion, one or more Belleville washers disposed adjacent to the first backing plate and configured to maintain a compression load on the friction portion, a second backing plate disposed adjacent to the one or more Belleville washers, and one or more set screws configured to press against the second backing plate to change the compression load on the friction portion. The friction portion is configured to be pressed against a lateral surface of the second end of the deployment arm such that the friction portion provides a predetermined torque.

According to certain embodiments of the present invention, a passenger seat comprises a deployment apparatus comprising a deployment object, a deployment arm with a first end coupled to the deployment object and a second end having a pivot, and a hinge assembly rotatably attached to the pivot of the deployment arm. The hinge assembly comprises an enclosure and a friction stop device disposed within the enclosure such that the friction stop device comprises a friction portion configured to be pressed against a lateral surface of the pivot of the deployment arm such that the friction portion provides a predetermined torque.

The predetermined torque, in certain embodiments, is calculated based on maintaining a deployed angle of the deployment arm such that the deployment object is held in a raised deployed position.

In some embodiments, the friction portion is disposed axially with respect to a rotational axis at the second end of the deployment arm.

The friction stop device, in certain embodiments, further comprises a first backing plate bonded to the friction portion.

The friction stop device, in some embodiments, further comprises one or more Belleville washers configured to maintain a compression load on the friction portion.

In certain embodiments, the hinge assembly further comprises one or more set screws configured to change a compression load on the friction portion.

DETAILED DESCRIPTION

Figure 1:
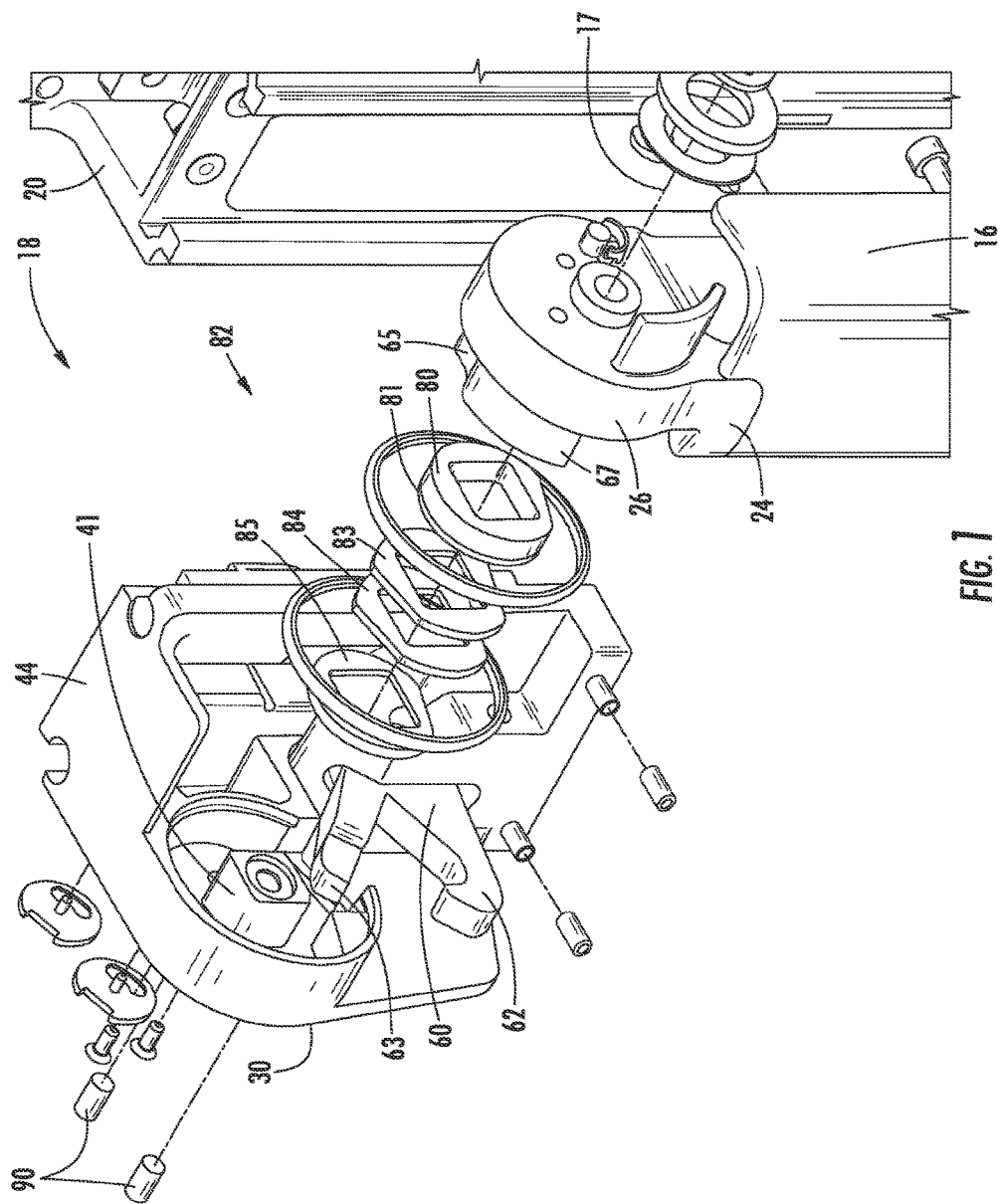
FIG. 1 is an exploded perspective view of a hinge assembly according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide deployment mechanisms for a passenger seat or passenger seats. While embodiments of the deployment mechanisms are discussed for use with aircraft seats, they are by no means so limited. Rather, embodiments of the deployment mechanisms may be used in passenger seats or other seats of any type or otherwise as desired.

FIGS. 1-14 illustrate embodiments of a deployment apparatus 10. In these embodiments, the deployment apparatus 10 comprises a deployment object 12, a deployment connector 14, a deployment arm 16, and a hinge assembly 18. The hinge assembly 18 includes an enclosure 44 and a friction stop device 82 disposed within the enclosure 44. The friction stop device 82 may include a friction portion 80 where the friction portion 80 is configured to be pressed against a lateral surface of the pivot 26 of the deployment arm 16 such that the friction portion 80 provides a predetermined torque.

Figure 3:
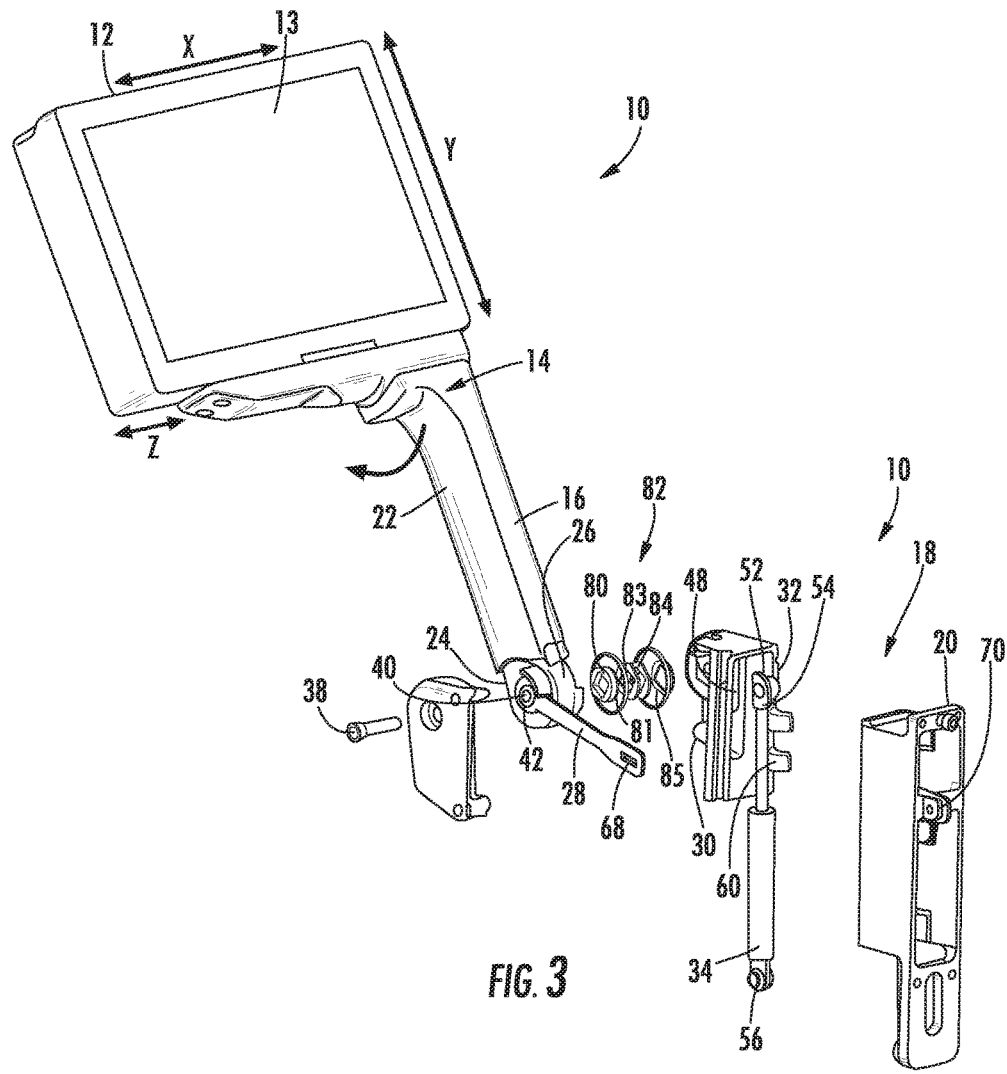
FIG. 3 is an exploded perspective view of a deployment apparatus incorporating the hinge assembly of FIG. 1.
Figure 4:
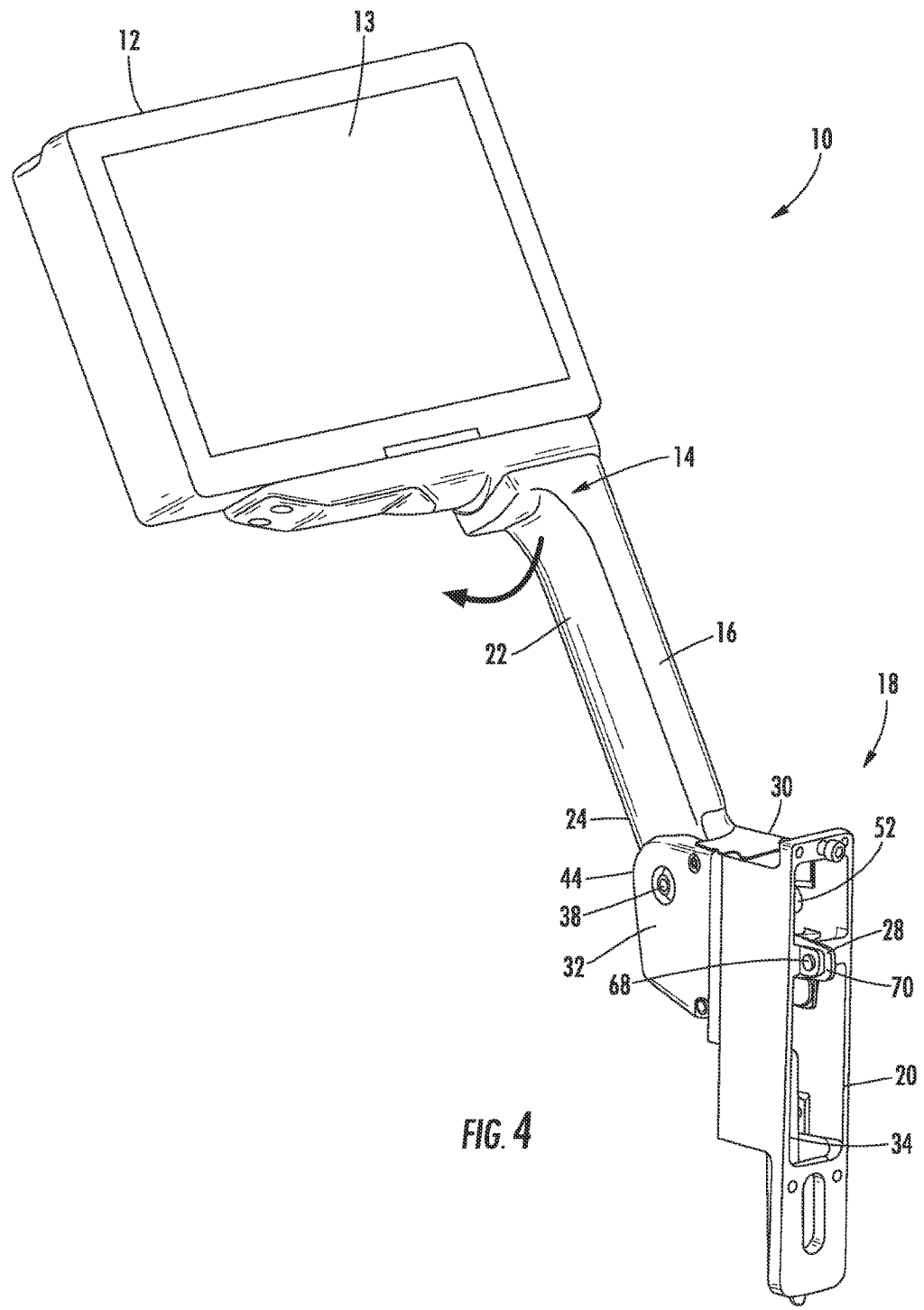
FIG. 4 is an assembled perspective view of the deployment apparatus of FIG. 3.

In some embodiments, as shown in FIGS. 3 and 4, the deployment object 12 is a three-dimensional object having a length X, a height Y, and a depth Z, where the X and Y sides define a surface area 13. The deployment object 12 may be any object including but not limited to any type of screen or monitor that displays visual images corresponding to electrical signals that it receives from an appropriate source, a food tray, a cocktail table/tray, or other similar objects.

The deployment object 12 is pivotally coupled to the deployment connector 14. The deployment connector 14 has any appropriate shape that allows the deployment object 12 to pivot relative to its coupling to the deployment connector 14. In one embodiment, as shown in FIGS. 3 and 4, the deployment connector 14 includes a rounded seat that is pivotally coupled to at least a portion of the lower length X of the deployment object 12.

FIGS. 3 and 4 illustrate certain embodiments of the coupling between the deployment connector 14 and the deployment arm 16. In these embodiments, the deployment connector 14 is coupled to a first end 22 of the deployment arm 16 in a manner that allows the deployment connector 14 to rotate relative to the deployment arm 16 along the longitudinal axes of both the deployment connector 14 and the deployment arm 16. Both the deployment connector 14 and the deployment arm 16 may be formed of any suitable material including but not limited to aluminum, stainless steel, other metallic material, composite material, or other similar material. The deployment arm 16 may have any appropriate cross-sectional shape including but not limited to rectilinear, oval, circular, triangular, or any other similar shape. The longitudinal shape of the deployment arm 16 may have a straight, curved, or any other suitable profile.

In some embodiments, a second end 24 of the deployment arm 16 includes a pivot 26. The deployment arm 16 is pivotally coupled to the hinge assembly 18 at the deployment arm mount 20 via the pivot 26, where the pivot 26 is shaped to allow the deployment arm 16 to pivot relative to the hinge assembly 18. The pivot 26 may have a cylindrical, oval, spherical, or other similar shape that allows the pivot 26 to rotate in a suitable manner.

FIGS. 1, 2, and 5-14 illustrate embodiments of the hinge assembly 18. In these embodiments, the hinge assembly 18 comprises a deployment link 28, a pivot housing 30, a cable cover 32, a gas spring 34, and at least two linear guides 36. In some embodiments, a mating surface of the deployment link 28 confronts a mating surface on the pivot 26. The pivot 26 is coupled to the deployment link 28 by a fastener 38 that passes through an aperture 40 in the pivot 26 and a co-centrically aligned aperture 42 in one end of the deployment link 28. However, the pivot 26 and the deployment link 28 may be coupled by any appropriate manner that allows the pivot 26 and the deployment link 28 to rotate relative to one another.

Figure 2:
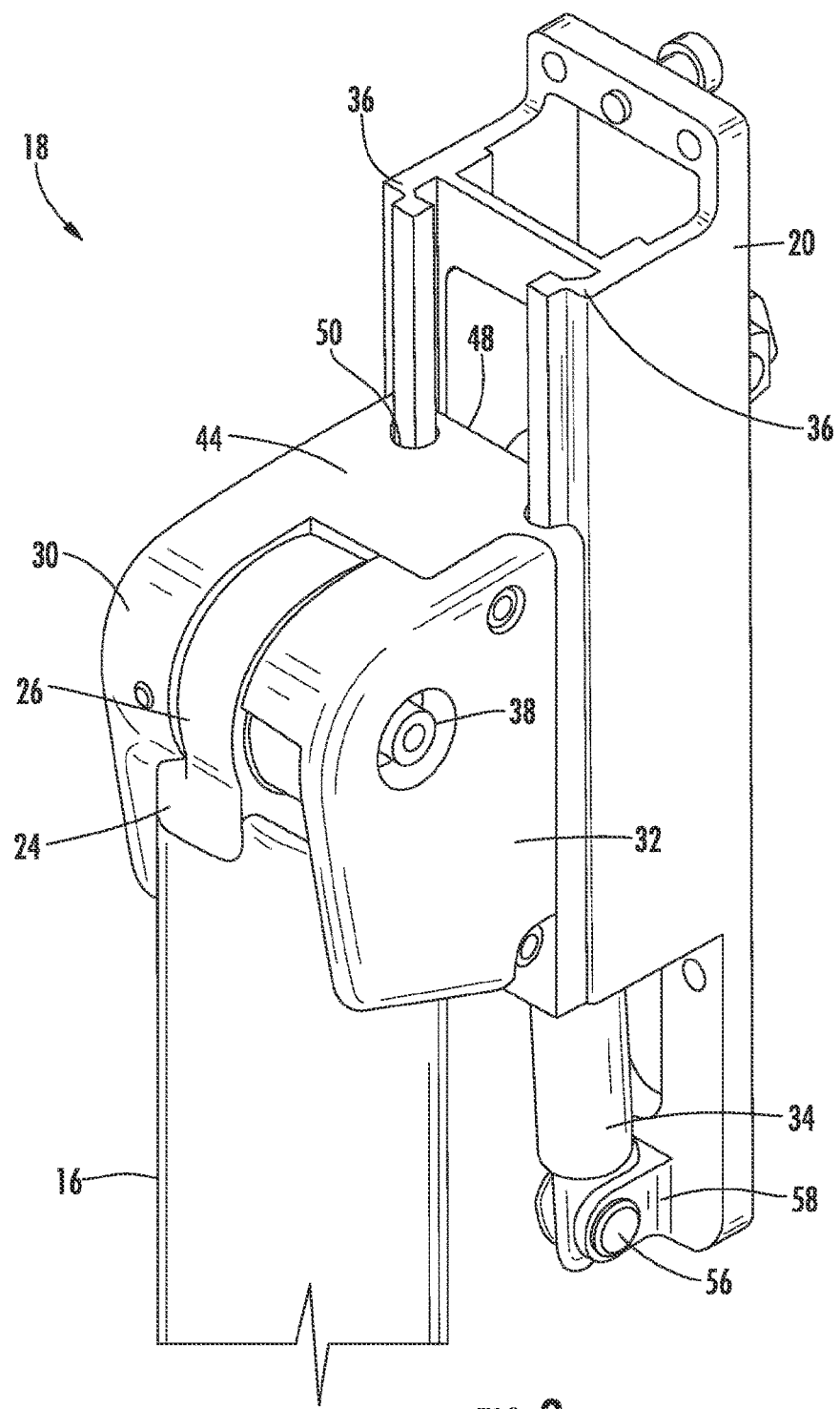
FIG. 2 is an assembled perspective view of the hinge assembly of FIG. 1.

In some embodiments, as shown in FIG. 2, the pivot housing 30 is positioned adjacent one side of the coupled pivot 26 and the deployment link 28, and the cable cover 32 is positioned adjacent the opposing side of the pivot 26 and the deployment link 28. The pivot housing 30 and the cable cover 32 are coupled to one another to form an enclosure 44 surrounding the junction between the pivot 26 and the deployment link 28. The pivot housing 30 and the cable cover 32 may be formed of any suitable material including but not limited to aluminum, stainless steel, other metallic material, composite material, or other similar material.

In embodiments shown in FIGS. 5-8, the pivot 26 also includes a rotation limiting pin 46. The rotation limiting pin 46 is located on the mating surface of the pivot 26 that confronts the deployment link 28. When the deployment arm 16 is placed in certain orientations relative to the deployment link, the rotation limiting pin 46 is rotated into a position where the rotation limiting pin 46 contacts the deployment link 28.

Figure 5:
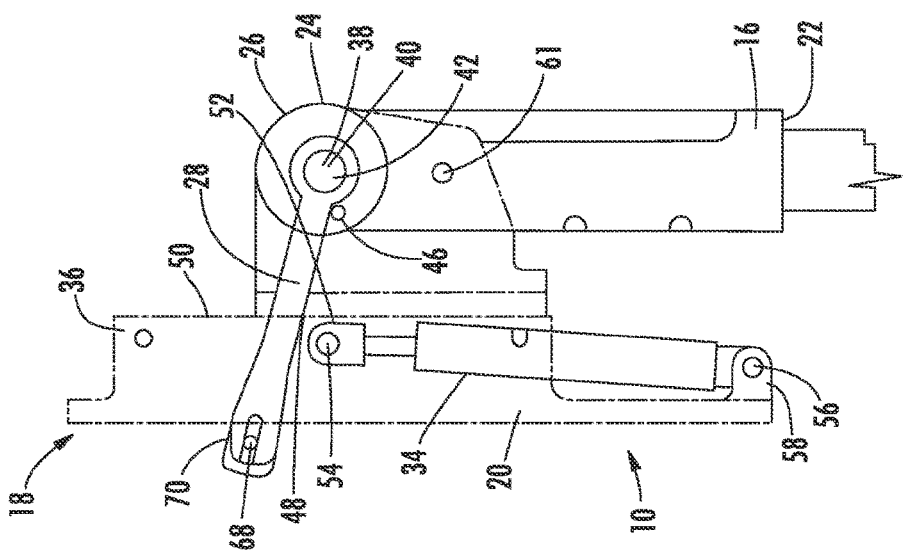
FIG. 5 is a side view of the deployment apparatus of FIG. 3 in a stowed position.
Figure 8:
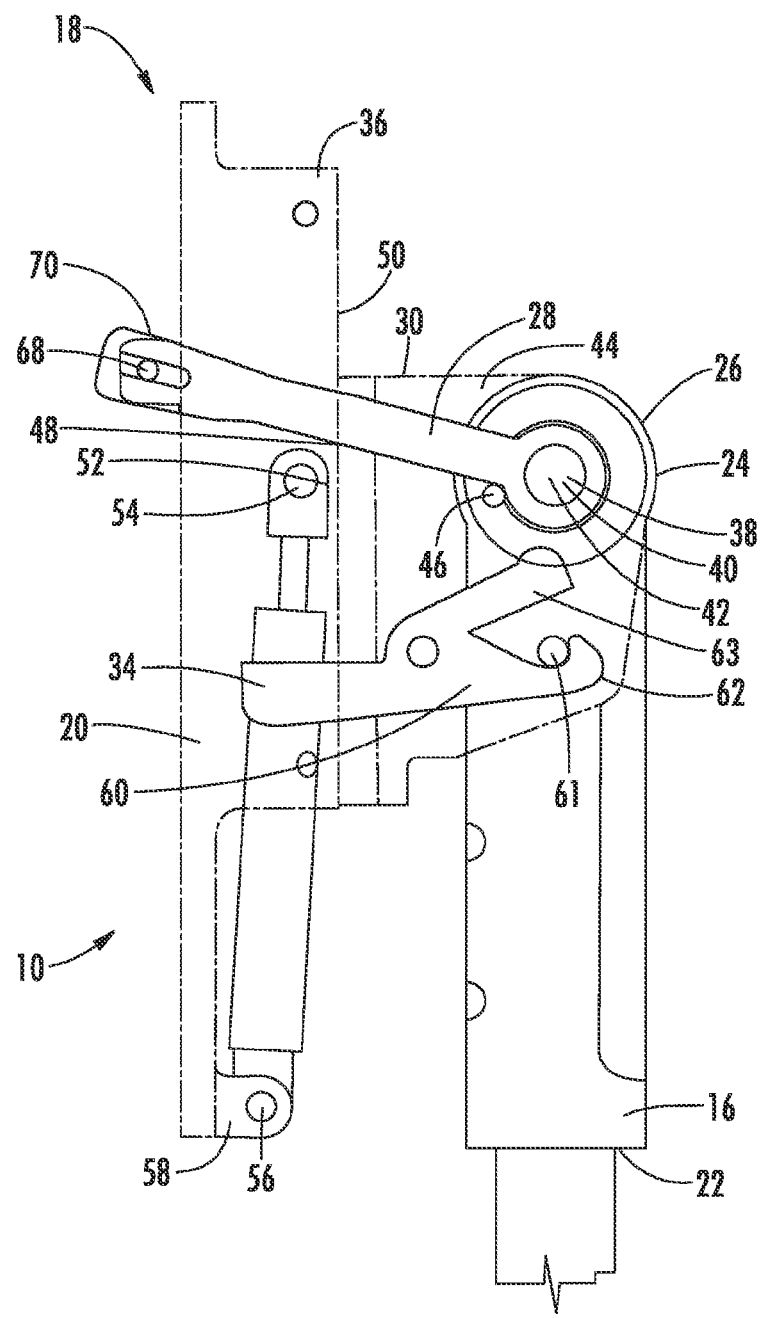
FIG. 8 is another side view of the deployment apparatus of FIG. 3 in a stowed position.

The rotation limiting pin 46 contacts the deployment link 28 over a range of angles from a stowed angle to a released angle. The stowed angle position may be defined as any appropriate angle formed between the deployment arm 16 and a vertical axis. In one embodiment, as shown in FIGS. 5 and 8, the stowed angle position is an angle of approximately 0 degrees between the deployment arm 16 and the vertical axis. However, one of skill in the relevant art will understand that any appropriate angle may be used that results in a stowed position of the deployment apparatus 10.

Figure 6:
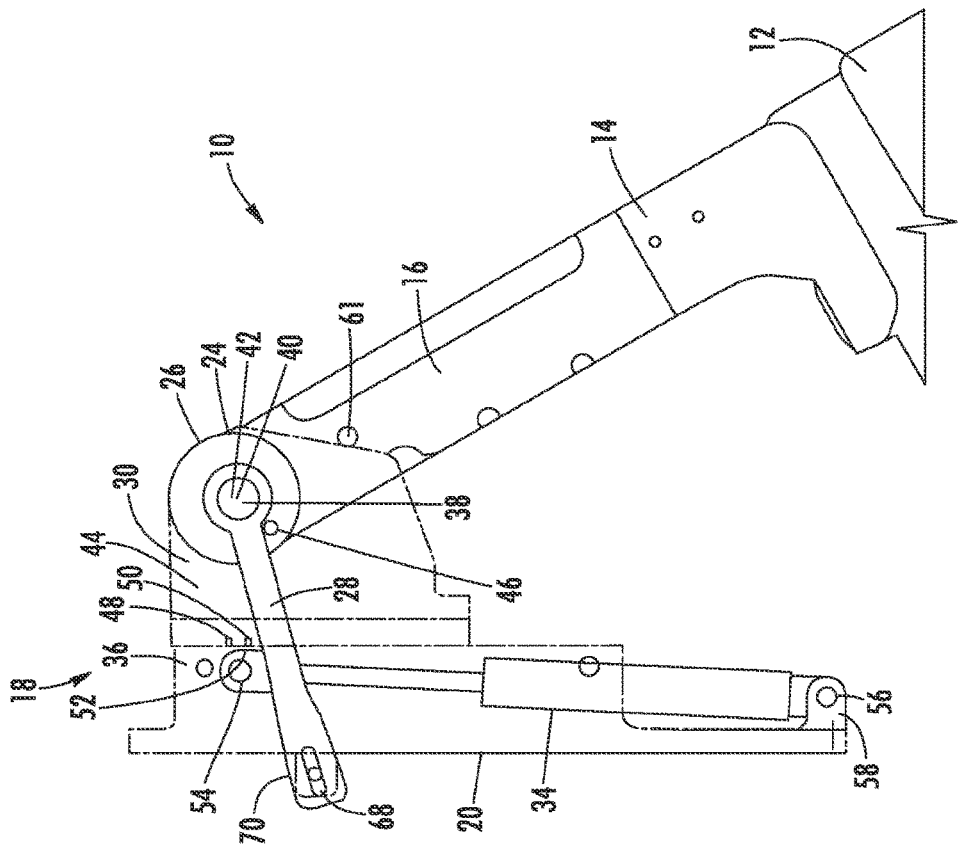
FIG. 6 is a side view of the deployment apparatus of FIG. 3 in a released position.

The released angle may range from 10 degrees to 60 degrees from the stowed angle position, and may preferably be approximately 30 degrees from the stowed angle position (see released angle position shown in FIG. 6). When the deployment arm 16 is positioned at the stowed angle, the deployment link 28 prevents further travel of the deployment arm 16 along its rotational arc in that direction.

As shown in FIG. 2, some embodiments of an external rear surface 48 of the pivot housing 30 include a plurality of linear bearings 50. The linear bearings 50 provide a sliding surface between the pivot housing 30 and the at least two linear guides 36 (i.e., tracks). In some embodiments, the linear bearings 50 include but are not limited to inserted bearings or bushings. The at least two linear guides 36 are in turn coupled to the deployment arm mount 20. In some embodiments, the linear guides 36 are integrated into the deployment arm mount 20. The linear bearings 50 and the linear guides 36 may be formed of any suitable material that does not impede the ability of the pivot housing 30 to travel along the at least two linear guides 36. For example, the linear bearing 50 materials include but are not limited to nylon, DELRIN (polyoxymethylene), TEFLON (polytetrafluoroethylene), or other similar coating materials. The linear guide 36 materials include but are not limited to aluminum, to stainless steel, other metallic material, composite material, or other similar material.

The deployment arm mount 20 may be formed of any suitable material including but not limited to aluminum, stainless steel, other metallic material, composite material, or other similar material. The deployment arm mount 20 and the at least two linear guides 36 have a length that accommodates the vertical travel distance required by the pivot housing 30 to achieve the desired reduction in swing trajectory of the deployment object 12.

The pivot housing 30 also includes a projection 52. An upper end 54 of the gas spring 34 is coupled to the projection 52 and the lower end 56 of the gas spring 34 is coupled to a projection 58 extending from the deployment arm mount 20. In other embodiments, the gas spring 34 is coupled to a link, which in turn is coupled to the pivot housing 30. One of skill in the relevant art will understand that the gas spring 34 may be coupled to the pivot housing 30 and the deployment arm mount 20 in any suitable manner including but not limited to pins, screws, or other types of mechanical fasteners.

Figure 7:
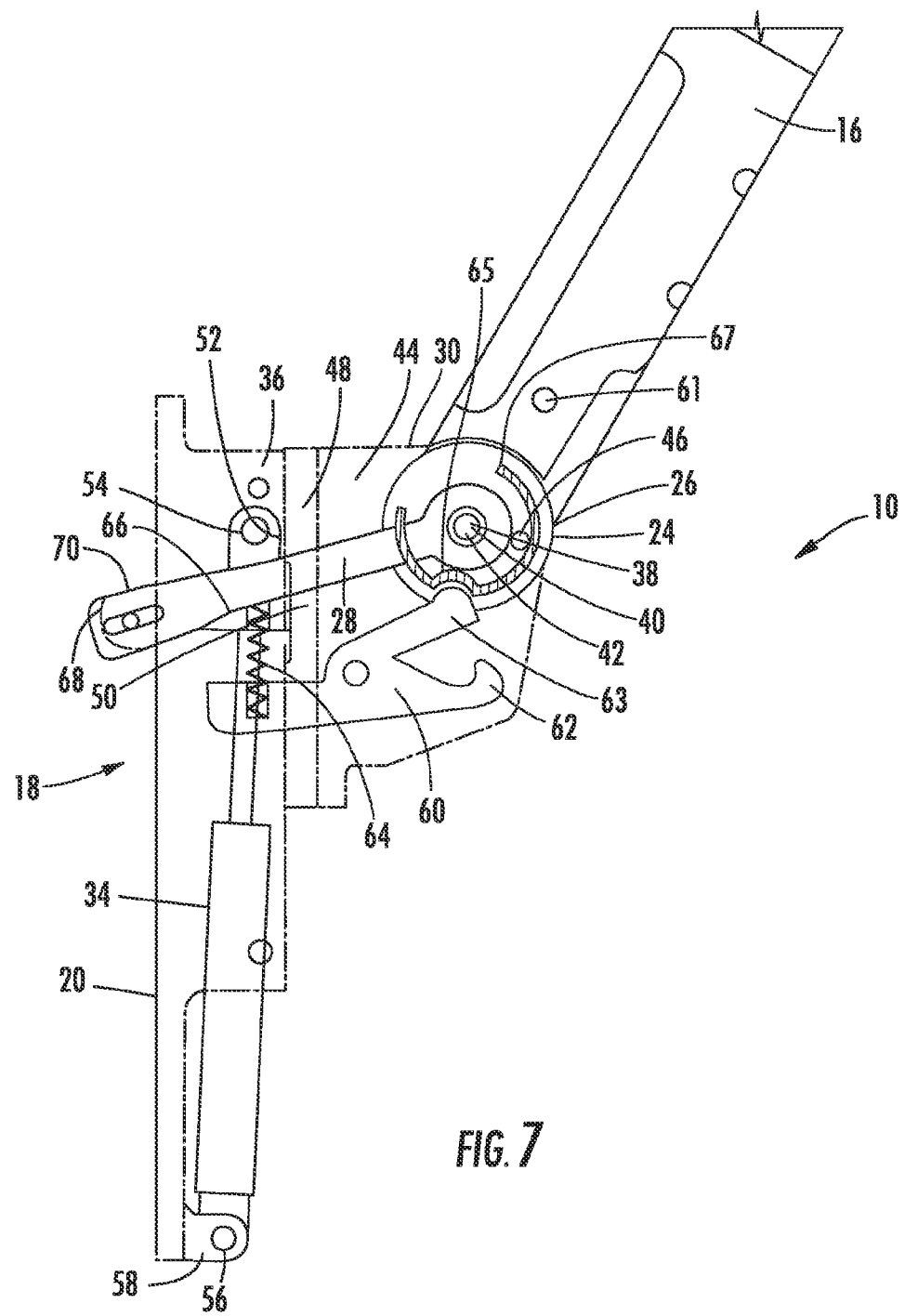
FIG. 7 is a side view of the deployment apparatus of FIG. 3 in a deployed position.

In some embodiments, as shown in FIGS. 1, 7, and 8, the pivot housing 30 includes a locking arm 60. The locking arm 60 includes a hook 62 that is configured to engage a latch pin 61 on the deployment arm 16. In addition, the locking arm 60 includes a projection 63 configured to engage a notch 65 located on an outer surface of sleeve 67. The locking arm 60 is also coupled at its opposing end to one end of a spring 64. The spring 64 is coupled at its opposing end to a projection 66 extending from the pivot housing 30. To move from the stowed position (shown in FIGS. 5 and 8) to the released angle position (shown in FIG. 6), the locking arm 60 releases the latch pin 61 when a passenger pulls a lever or pushes a button that lifts the locking arm 60 and compresses the spring 64 (i.e., to lower hook 62). In other embodiments, any suitable releasable mechanical fasteners may be used to releasably engage the latch pin 61. When the deployment arm 16 is rotated, the projection 63 contacts the outer surface of sleeve 67 and, when the deployment arm 16 reaches the deployed position with deployment object 12 in a raised position (shown in FIGS. 3, 4, and 7), projection 63 moves into notch 65 (due to the force provided by spring 64) to act as a mechanical lockout.

FIGS. 5-8 illustrate embodiments in which an opposing end 68 of the deployment link 28 is pivotally coupled to a projection 70 extending from the deployment arm mount 20. As a result, the end 68 creates a fixed point about which the deployment link 28 pivots. In other embodiments, the opposing end 68 may be coupled to any appropriate structure that restricts the movement of the opposing end 68.

In the embodiments illustrated in FIGS. 1-14, a passenger releases the locking arm 60 to deploy the deployment object 12 from its stowed angle position. Releasing the locking arm 60 moves hook 62 to disengage from the latch pin 61. Such movement of the locking arm 60 also moves projection 63; however, when the deployment arm 16 is located in or near the stowed or released positions, the notch 65 is not disposed near projection 63 and thus such movement of projection 63 does not engage or disengage any mechanical lockout. The disengagement from latch pin 61 releases the gas spring 34, which causes the pivot housing 30 to travel to the upper end of the at least two linear guides 36. The upward movement of the pivot housing 30 simultaneously causes the deployment link 28 to press against the rotation limiting pin 46, which in turn causes the deployment arm 16 to rotate outwardly from its stowed angle position. The simultaneous upward and outward movement of the deployment arm 16 places the deployment arm 16 into the released angle position, which is illustrated in FIG. 6.

Once the deployment arm 16 is in the released angle position, a passenger may then manually pull the deployment arm 16 into a desired deployment angle, where the deployment angle may range from the released angle to 150 degrees, with the released angle setting controlled by the hinge assembly 18. As illustrated in FIG. 7, the passenger then rotates the deployment object 12 into a deployed position for viewing. One exemplary example of a deployed position is illustrated in FIGS. 3, 4, and 7 where, as described above, a mechanical lockout (e.g., projection 63 engages notch 65) locks deployment arm 16.

When the passenger is ready to stow the deployment object 12, to move from the deployed raised position toward the stowed position (and/or toward the released angle position), the passenger actuates a mechanism to lift the locking arm 60 thereby compressing the spring 64 (i.e., to lower projection 63) to disengage the mechanical lockout. Such movement of the locking arm 60 also moves hook 62; however, when the deployment arm 16 is located in or near the deployed position, the latch pin 61 is not disposed near hook 62 and thus such movement of hook 62 does not engage or disengage from latch pin 61.

Once the mechanical lockout is disengaged (projection 63 withdraws from notch 65), the cantilevered mass of the deployment object 12 (and the mass of the deployment arm 16) urges the deployment arm 16 to rotate down toward the stowed position. Without any deterrent, such a cantilevered load could create sudden and/or rapid movement of the deployment arm 16 toward the stowed position that could injure a passenger or cause damage to the deployment object 12. To counteract the cantilevered load, however, the hinge assembly 18 includes a friction stop device 82 to prevent the deployment object 12 from falling. One example of a friction stop device 82 includes friction portion 80, which is configured to be pressed against a lateral surface of the pivot 26 of the deployment arm 16 such that the friction portion 80 provides a predetermined torque. In certain embodiments, this predetermined torque is calculated based on the cantilevered mass of the deployment object 12 and the deployment arm 16. The calculation also includes the dimensions (including diameter and surface area) and the necessary coefficient of friction of the friction portion 80. In addition, the number and size of the one or more set screws 90 (described in greater detail below) affect the torque calculation.

Figure 9:
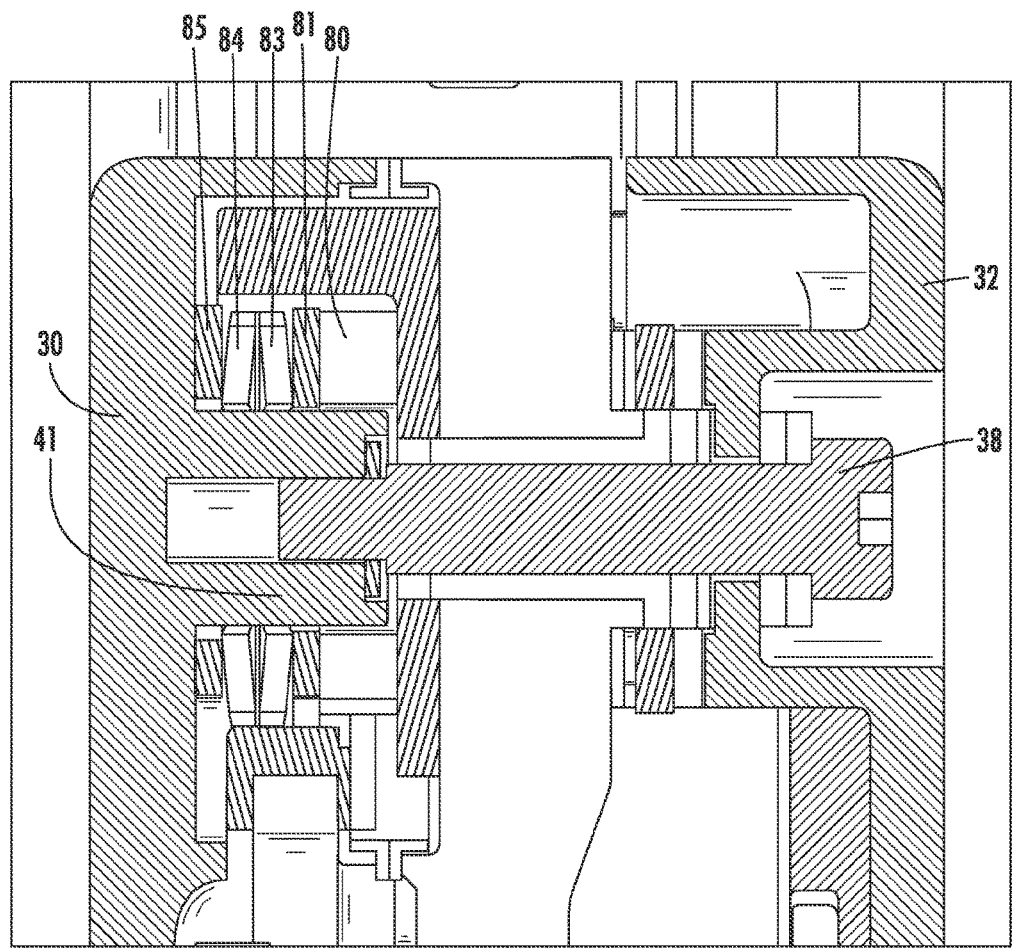
FIG. 9 is a cross-sectional view of the hinge assembly of FIG. 1.
Figure 11:
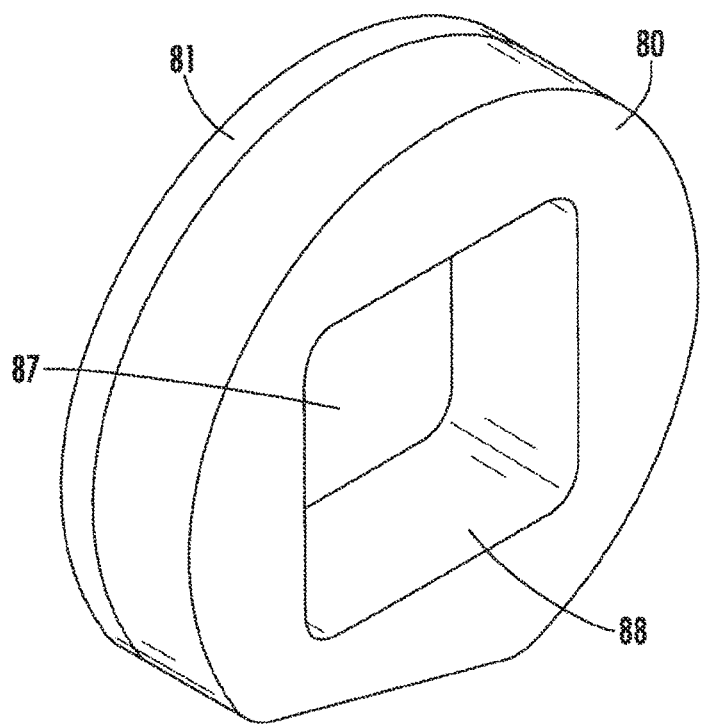
FIG. 11 is a perspective view of the friction portion of FIG. 10 and a backing plate of the hinge assembly of FIG. 1.

In some embodiments, as illustrated in FIGS. 1, 3, and 11, the friction stop device 82 may be arranged such that the friction portion 80 is bonded to a first backing plate 81. As shown in FIG. 1, the friction portion 80 may be disposed axially with respect to a rotational axis 17 at the second end 24 of the deployment arm 16. The friction stop device 82 also may include one or more springs. Any type of spring may be used. As shown in FIGS. 1, 3, and 9, one example of the one or more springs are Belleville washers 83 and 84 (i.e., coned-disc springs or conical spring washers) that are adjacent to the first backing plate 81. The Belleville washer (or washers) allows a preload (compression) to be applied to friction portion 80 while compensating for wear of the friction portion 80 and retaining a high fatigue life. Preload (compression) is applied by adjusting one or more set screws 90 where the set screw 90 (or screws) presses on a second backing plate 85. Although FIG. 1 illustrates embodiments with two set screws 90, any number of set screws 90 may be adapted for use with the present invention. The second backing plate 85 is disposed adjacent to an inner surface of enclosure 44 and adjacent to the Belleville washer (or washers) such that the second backing plate 85 is pressed by the one or more set screws 90 against the one or more Belleville washers. The two Belleville washers 83 and 84 illustrated in FIGS. 1, 3, and 9 are shown in parallel; however, any number of Belleville washers of varying thicknesses may be arranged in series and/or parallel to obtain a desired spring constant K.

Figure 10:
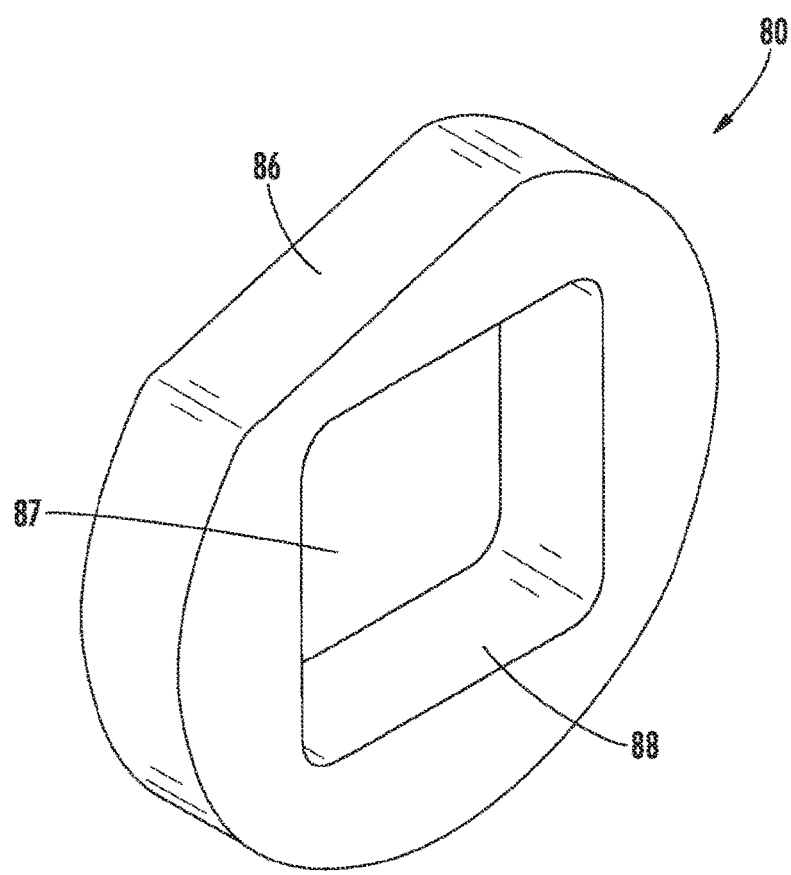
FIG. 10 is a perspective view of certain embodiments of a friction portion of the hinge assembly of FIG. 1.
Figure 12:
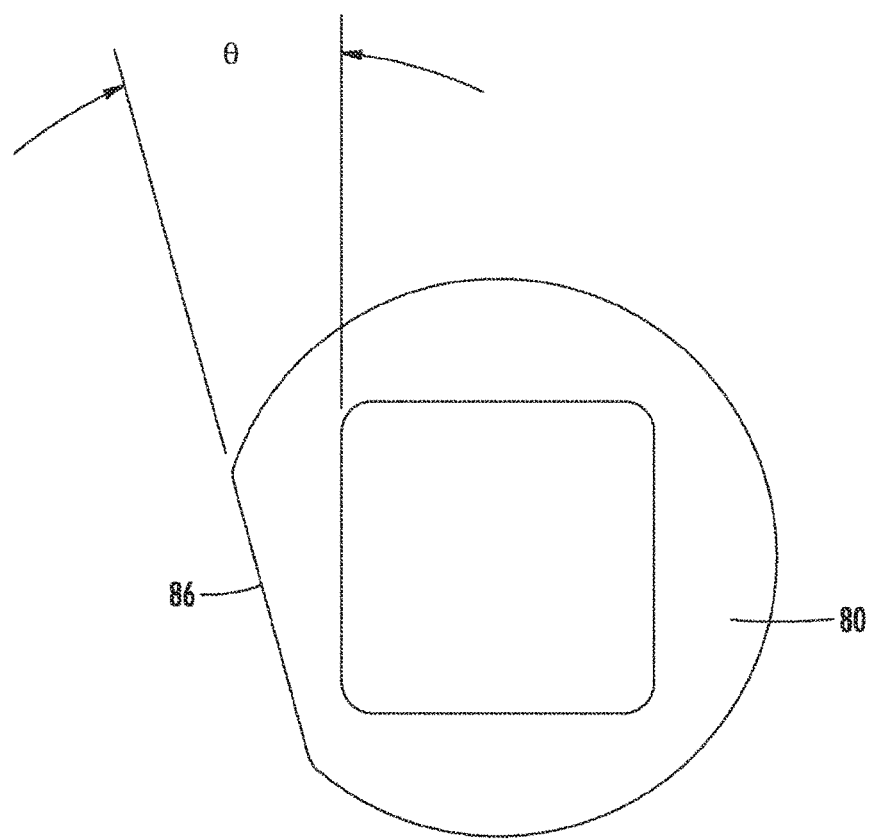
FIG. 12 is an end view of the friction portion of FIG. 10.

As shown in FIGS. 10-12, the friction portion 80 includes a substantially square central hole 87 that includes rounded corners and one or more internal surfaces 88 in order to correspond to center portion 41 of enclosure 44 (as shown in FIGS. 1 and 9). In some embodiments, central hole 87 substantially corresponds to the shape of center portion 41. In addition, center portion 41 may be cylindrical, triangular, pentagonal, hexagonal, octagonal, or any suitable shape such that central hole 87 substantially corresponds. Friction portion 80 also includes a cylindrical outer surface except for one or more flat surfaces 86. In some embodiments, as illustrated in FIG. 12, the one or more flat surfaces 86 are disposed with an angle θ with respect to one of the internal surfaces 88. In some embodiments, angle θ is approximately 15 degrees.

The friction portion 80 may be formed of materials including, but not limited to, a composite material, aluminum, stainless steel, aramid fibers, polycarbonate, polypropylene, other metallic materials, other composite materials, plastic, thermoplastic, or other similar materials. In some embodiments, friction portion 80 comprises a die cast friction product.

The first and second backing plates 81 and 85 may be formed of materials including, but not limited to, stainless steel, aluminum, aramid fibers, polycarbonate, polypropylene, other metallic materials, composite materials, plastic, thermoplastic, or other similar materials.

After the user actuates a mechanism for disengaging the mechanical lockout, the hinge assembly 18 suspends the deployment object 12 (e.g., using friction portion 80) such that, when the passenger is ready to stow the deployment object 12, the passenger may manually rotate the deployment arm 16 toward the stowed position. In other words, the hinge assembly 18 is configured to provide sufficient resistance to prevent the deployment arm 16 from rotating due to the weight of the deployment object 12 but sufficiently small resistance such that a user may easily rotate the deployment arm 16 to overcome the resistance.

Figure 13:
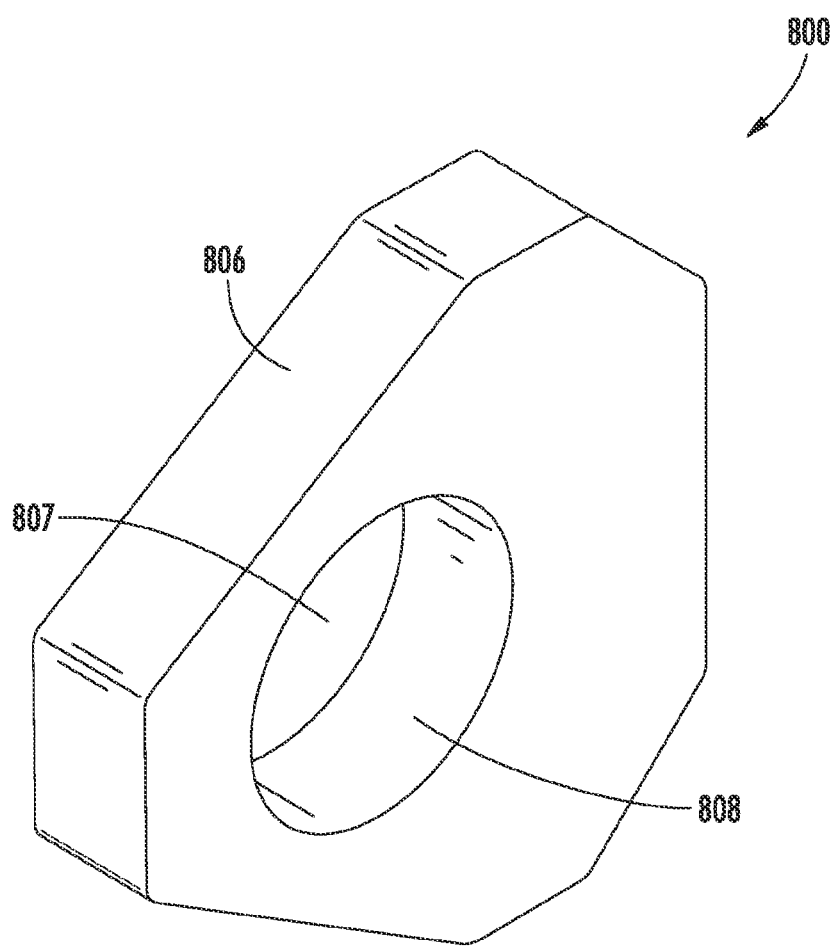
FIG. 13 is a perspective view of additional embodiments of a friction portion of the hinge assembly of FIG. 1.
Figure 14:
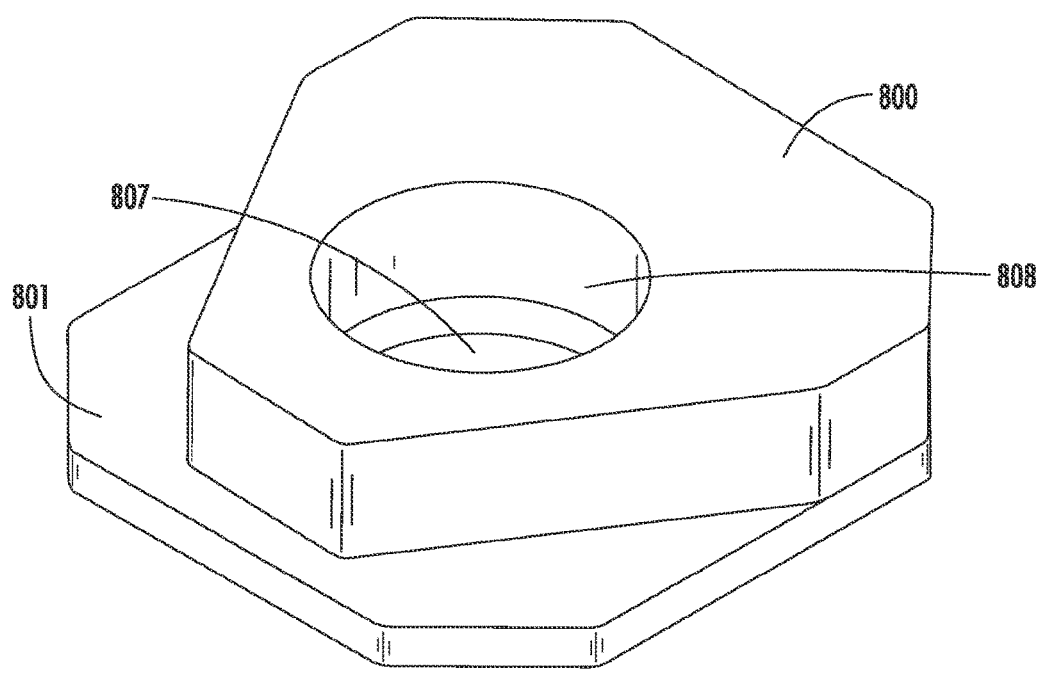
FIG. 14 is a perspective view of the friction portion of FIG. 13 and a backing plate of the hinge assembly of FIG. 1.

Although FIGS. 1 and 3 illustrate an assembly with friction portion 80 having a cylindrical outer surface and an approximately square central hole, embodiments of a friction portion are not limited thereto. For example, as shown in FIGS. 13 and 14, in some embodiments, a friction portion 800 comprises one or more flat outer surfaces 806 and an approximately circular central hole 807 with one or more internal surfaces 808. In some embodiments, as illustrated in FIG. 14, the friction portion 800 is bonded to a first backing plate 801. As shown in FIG. 14, in some embodiments, first backing plate 801 is a rectangular or square plate with chamfered corners.

The friction portion 800 may be formed of materials including, but not limited to, a composite material, aluminum, stainless steel, aramid fibers, polycarbonate, polypropylene, other metallic materials, other composite materials, plastic, thermoplastic, or other similar materials. In some embodiments, friction portion 800 comprises a die cast friction product.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A deployment apparatus comprising:
  a deployment object;
  a deployment arm with a first end coupled to the deployment object and a second end having a pivot; and
  a hinge assembly rotatably attached to the pivot of the deployment arm, the hinge assembly comprising a deployment arm mount, an enclosure, and a friction stop device disposed within the enclosure, the friction stop device comprising a friction portion configured to be pressed against a lateral surface of the pivot of the deployment arm such that the friction portion provides a predetermined torque, wherein the deployment arm mount comprises at least two tracks that are slidingly engaged with a plurality of linear bearings on a surface of the enclosure.

2. The deployment apparatus of claim 1, wherein the predetermined torque is calculated based on maintaining a deployed angle of the deployment arm such that the deployment object is held in a raised deployed position.

3. The deployment apparatus of claim 1, wherein the friction portion is disposed axially with respect to a rotational axis at the second end of the deployment arm.

4. The deployment apparatus of claim 1, wherein the friction stop device further comprises a first backing plate bonded to the friction portion.

5. The deployment apparatus of claim 1, wherein the friction stop device further comprises one or more Belleville washers configured to maintain a compression load on the friction portion.

6. The deployment apparatus of claim 1, wherein the hinge assembly further comprises one or more set screws configured to change a compression load on the friction portion.

7. The deployment apparatus of claim 1, wherein the deployment object is selected from the group consisting of a display monitor, a tray table, and a cocktail table.

8. The deployment apparatus of claim 1, wherein the hinge assembly further comprises a gas spring coupled at one end to the enclosure and coupled at an opposing end to the deployment arm mount.

9. The deployment apparatus of claim 1, wherein the friction portion comprises a centrally located substantially square hole.

10. The deployment apparatus of claim 1, wherein the friction portion comprises a cylindrical outer surface except for one or more flat surfaces.

11. The deployment apparatus of claim 1, wherein the hinge assembly further comprises a mechanical lockout configured to maintain the deployment object in a deployed position.

12. The deployment apparatus of claim 11, wherein the mechanical lockout comprises a projection configured to engage a notch.

13. A deployment apparatus comprising:
a deployment object;
a deployment arm with a first end coupled to the deployment object; and
a hinge assembly that is rotatably attached to a second end of the deployment arm, the hinge assembly comprising:
an enclosure;
a friction stop device disposed within the enclosure, the friction stop device comprising a friction portion disposed axially with respect to a rotational axis at the second end of the deployment arm;
a first backing plate bonded to the friction portion;
one or more Belleville washers disposed adjacent to the first backing plate and configured to maintain a compression load on the friction portion;
a second backing plate disposed adjacent to the one or more Belleville washers; and
one or more set screws configured to press against the second backing plate to change the compression load on the friction portion,
wherein the friction portion is configured to be pressed against a lateral surface of the second end of the deployment arm such that the friction portion provides a predetermined torque.

14. A passenger seat comprising:
a deployment apparatus comprising:
a deployment object;
a deployment arm with a first end coupled to the deployment object and a second end having a pivot; and
a hinge assembly rotatably attached to the pivot of the deployment arm, the hinge assembly comprising a deployment arm mount, an enclosure, and a friction stop device disposed within the enclosure, the friction stop device comprising a friction portion configured to be pressed against a lateral surface of the pivot of the deployment arm such that the friction portion provides a predetermined torque,
wherein the deployment arm mount comprises at least two tracks that are slidingly engaged with a plurality of linear bearings on a surface of the enclosure.

15. The passenger seat of claim 14, wherein the predetermined torque is calculated based on maintaining a deployed angle of the deployment arm such that the deployment object is held in a raised deployed position.

16. The passenger seat of claim 14, wherein the friction portion is disposed axially with respect to a rotational axis at the second end of the deployment arm.

17. The passenger seat of claim 14, wherein the friction stop device further comprises a first backing plate bonded to the friction portion.

18. The passenger seat of claim 14, wherein the friction stop device further comprises one or more Belleville washers configured to maintain a compression load on the friction portion.

19. The passenger seat of claim 14, wherein the hinge assembly further comprises one or more set screws configured to change a compression load on the friction portion.

* * * * *